United States Patent
Mukherjee et al.

(10) Patent No.: US 8,589,561 B2
(45) Date of Patent: Nov. 19, 2013

(54) SESSION LEVEL TECHNIQUE FOR IMPROVING WEB BROWSING PERFORMANCE ON LOW SPEED LINKS

(75) Inventors: Sarit Mukherjee, Morganville, NJ (US); Sampath Rangarajan, Bridgewater, NJ (US); Pablo Rodriguez, Cambridge (GB)

(73) Assignee: Alcatel Lucent, Paris (FR)

(*) Notice: Subject to any disclaimer, the term of this patent is extended or adjusted under 35 U.S.C. 154(b) by 1923 days.

(21) Appl. No.: 11/085,849

(22) Filed: Mar. 22, 2005

(65) Prior Publication Data
US 2006/0218304 A1    Sep. 28, 2006

(51) Int. Cl.
G06F 15/16    (2006.01)

(52) U.S. Cl.
USPC ............... 709/227; 455/414.1; 455/432.1

(58) Field of Classification Search
USPC .................. 709/203, 227, 238, 246, 206; 455/414.1, 432.1
See application file for complete search history.

(56) References Cited

U.S. PATENT DOCUMENTS

| | | | | |
|---|---|---|---|---|
| 6,049,821 | A * | 4/2000 | Theriault et al. | 709/203 |
| 6,389,462 | B1 | 5/2002 | Cohen et al. | |
| 6,654,786 | B1 * | 11/2003 | Fox et al. | 709/203 |
| 6,701,374 | B2 * | 3/2004 | Gupta et al. | 709/238 |
| 7,032,031 | B2 * | 4/2006 | Jungck et al. | 709/246 |
| 7,184,764 | B2 * | 2/2007 | Raviv et al. | 455/432.1 |
| 7,213,071 | B2 * | 5/2007 | DeLima et al. | 709/227 |
| 7,305,230 | B2 * | 12/2007 | Zhigang | 455/414.1 |
| 7,349,967 | B2 * | 3/2008 | Wang | 709/227 |
| 7,359,985 | B2 * | 4/2008 | Grove et al. | 709/238 |
| 7,653,689 | B1 * | 1/2010 | Champagne et al. | 709/206 |

* cited by examiner

*Primary Examiner* — Dustin Nguyen
(74) *Attorney, Agent, or Firm* — Wall & Tong, LLP (57) ABSTRACT

A method and apparatus for retrieving embedded objects of a web page across links. The method and apparatus include receiving, at a gateway, a requested top-level web page having at least one embedded uniform resource locator (URL) from at least one content server in response to a request for the web page from an end-user browser.
The at least one embedded URL is modified with an IP address of a caching proxy. The caching proxy may be either co-located or separate from the gateway. The top-level web page and modified embedded URLs are sent to the end-user browser, wherein the caching proxy forwards the at least one embedded URL from the at least one content server to the end-user browser.

20 Claims, 5 Drawing Sheets

SESSION LEVEL TECHNIQUE FOR IMPROVING WEB BROWSING PERFORMANCE ON LOW SPEED LINKS

FIELD OF INVENTION

The present invention relates to computer networks, and more specifically, to a method and apparatus for enhancing hypertext transfer protocol (HTTP) downloads by a browser from a content server.

DESCRIPTION OF THE BACKGROUND ART

In current third generation wireless networks, the wireless links have very large and variable Round-Trip Times (RTTs). This is due to the need for buffering and retransmissions from the base station to the mobile node (MN) at the link-layer to compensate for packet losses. Experiments conducted on deployed systems show that the RTTs experienced across the wireless link vary from approximately 300 msec up to 1 sec. Accordingly, user experienced throughput for specific applications is much lower than the maximum possible physical layer data rate.

For example, with CDMA2000-1xRTT (Radio Transmission Technology) physical layer, the maximum physical layer data rate is 153.6 Kbps. Here the maximum transmission control protocol (TCP) throughput (with protocol overhead) is approximately 128 Kbps. However, measurements have shown that when using file transport protocol (FTP) connectivity, the throughput achieved in an unloaded CDMA2000-1xRTT cell is in the range of 100 to 120 Kbps. Alternatively, when using hypertext transfer protocol (HTTP) connectivity, the throughput is much lower in a range of 50 to 70 Kbps. As such, when utilizing FTP connections, the throughput approaches that of raw TCP, since the connections are usually long-lived.

HTTP throughput is degraded mainly due to the following two reasons. First, popular web pages usually contain several embedded objects hosted under different domain names. For example, sites such as www.weather.com, finance.cnn.com, etc. have embedded objects that point to many distinct domains. This behavior is seen even with uniform resource locator (URL) rewritten pages, where the embedded objects are rewritten to point to the Content Delivery Network's (CDN) server. For example, the embedded URLs in the top level pages for Shari's Berries (www.berries.com) and Britannica (www.britannica.com), both of which are URL-rewritten, illustratively point to sixteen different domain names associated with Akamai Technologies, Inc. of Cambridge, Mass. The web browser performs DNS queries for these domain names, each of which incurs one to three seconds delay.

Second, and on top of this, the time-to-live (TTL) parameter for DNS responses to the popular web sites is kept small so that DNS based load-balancing to one of multiple servers is possible. With web sites that are served through CDNs, this is certainly a requirement so that the CDN service provider can redirect requests to an "optimal" server in their network. A smaller TTL suppresses the advantages of DNS caching and leads to the browser making very frequent queries to the DNS server to resolve domain names.

The web browser at the MN opens at least one (possibly more) TCP connection to each domain name referred to by the embedded objects in a top level web page. Thus, even if the browser and the server support persistent connections (HTTP/1.0 keep-alive or HTTP/1.1), given that at least one persistent HTTP connection has to be opened to each distinct domain, and if the number of distinct domain names that host the embedded objects is large, then the number of TCP connections opened is also substantial.

The above behavior affects web browsing performance in wireline networks as well, however in wireless networks the effect is amplified across the wireless link, due to the large and varying RTT. Specifically, a large RTT increases the delay incurred by DNS lookups. Further, where there are numerous DNS lookups per web page, the delay increases substantially, thereby affecting the user perceived performance. A large RTT also leads to an increase in TCP connection establishment and the ramp up delay. Again, with the need to establish many TCP connections per web page, this affects user perceived performance. Thus, TCP setup delays of a large number of TCP connections, as well as delays due to DNS queries can account for a significant overhead, thereby leading to decreased HTTP throughput and degraded user perceived performance.

By contrast, it is noted that the FTP application, whose throughput is close to the theoretical maximum, performs only one DNS lookup for the server name and uses only one long-lived TCP connection to transfer the data. Therefore, there is a need in the art for optimization techniques to enhancing hypertext transfer protocol (HTTP) downloads by a browser from a content server. That is, there is a need to decrease the latency of user access to the objects by reducing the time to retrieve content between the user's browser and content servers that is caused by the multiple TCP connections and DNS lookups before the HTTP page can be displayed.

SUMMARY OF THE INVENTION

The disadvantages heretofore associated with the prior art are overcome by a novel method and apparatus for retrieving embedded objects of a web page across network links. In one embodiment, the method and apparatus include receiving, at a gateway, a requested top-level web page having at least one embedded uniform resource locator (URL) from at least one content server in response to a request for the web page from an end-user browser.

The at least one embedded URL is modified with an IP address of a caching proxy. The caching proxy may be either co-located or separate from the gateway. The top-level web page and modified embedded URLs are sent to the end-user browser, wherein the caching proxy forwards the at least one embedded URL from the at least one content server to the end-user browser.

In an instance where the end-user browser is provided on a mobile device (e.g., PDA, cellular phone, laptop, among other mobile devices having wireless capabilities), the present invention accommodates instances where a mobile user moves from its current region to a new region. In one embodiment, where gateway service not available in the current region but available in the new region, only new HTTP session requests (represented by new TCP connection requests) are serviced by the gateway 104 infrastructure in the new region.

In a second embodiment where the gateway 104 service is available at both the current and new regions, the service remains uninterrupted with respect to URL rewriting. In particular, as the user moves, new connections for web pages get serviced by the new region. If the user moves from the current region to the new region in the middle of an object download, then two cases arise: (i) if the current gateway is accessible from the new region, then the existing TCP connections will still be serviced by the current gateway, while new connections will be serviced by the new gateway. (ii) If the gateway in the current region is not reachable from the new region, then the new gateway will reset the TCP connection and the browser will automatically open a new TCP connection to retrieve the object.

In a third embodiment, a user moves from a region with the gateway service to a region without the gateway service in the middle of a page download. If the top-level page itself is retrieved from the network after the mobile node has moved to the new region, all the operations will progress correctly. That is, the top-level page and the embedded objects will now be fetched from the origin servers.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a method and apparatus for providing session level optimization techniques to enhance the current HTTP download mechanisms, to "mimic" the behavior of FTP over the wireless link to achieve better throughput. For sake of clarity and general understanding of the invention, the method and apparatus of the present invention is discussed in terms of wireless networks. However, the teachings here are applicable to improving web browsing performance on any type of link (e.g., dial-up networks), where latency across the links is high (e.g., greater than approximately 250 milliseconds).

The method described herein (a) minimizes the number of DNS requests made across the low speed (e.g., wireless) links and (b) minimizes the number of distinct TCP connections opened across the low speed (e.g., wireless) links when web pages are downloaded. In other words, most of the DNS lookups and short-lived TCP connections are pushed to the wireline part of the network, making the wireless part behave like an FTP session. The solution defined by the method and apparatus shown and discussed herein is HTTP standard compliant, and does not require any changes to be made to the web clients, web servers, and/or DNS servers.

The method of the present invention may be deployed transparently (to the web clients, the web servers, and the DNS servers) on a service provider network, and accommodates client mobility. It is noted that the solutions described herein can provide approximately a 30% to 50% decrease in end-to-end user perceived latency, as well as approximately a 50% to 100% increase in data throughput across wireless links for HTTP sessions.

Figure 1:
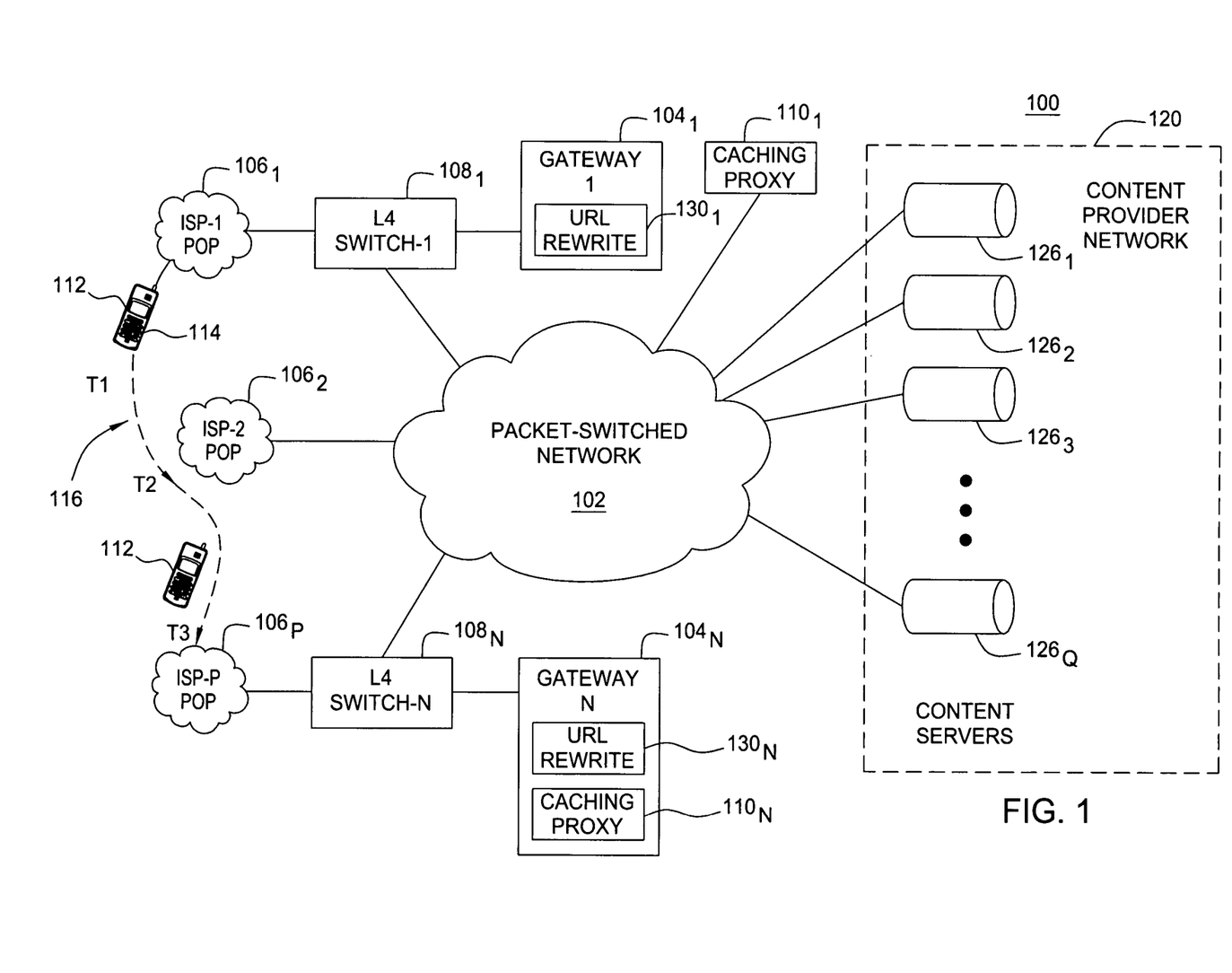
FIG. 1 depicts a high-level block diagram of an exemplary packet-switched network suitable for implementing the present invention.

FIG. 1 depicts a high-level block diagram of an exemplary network 100 suitable for implementing the present invention. The network 100 comprises a plurality of Internet Service Provider (ISP) points of presence (POP) $106_1$ through $106_p$ (collectively ISP-POPs 106, where p is an integer greater than one), at least one gateway $104_1$ through $104_n$ (collectively gateways 104, where n is an integer greater than 1), which is operated by an Internet service provider, a packet switched network (PSN) 102, at least one content provider network 120 having a plurality of content servers $126_1$ through $126_q$ (collectively content servers 126, where q is an integer greater than one), and at least one end-user device 112.

An ISP-POP 106 may be any low-speed link providing point-of-presence network access for an end-user device 112 to the content servers 126. Such low-speed links typically have a latency of 250 milliseconds or greater for transferring data across the links. In one embodiment, the ISP-POP 106 illustratively represents an access network that supports a wireless user device seeking connectivity in a wireless network. In another embodiment, the ISP-POP 106 illustratively represents a conventional dial-up modem providing access over a telephone line (POTS) for a wired computer device (e.g., laptop, desktop, among others) utilizing a wired network. One skilled in the art will appreciate that other types of ISP-POPs may be implemented for other types of low-speed links to a packet switched network (e.g., Internet), and such examples noted above are not to be considered as being limiting.

The ISP-POP 106 is used by an end user requesting content, illustratively, using an end-user device 112, which is a conventional computer device having a web browser 114 installed thereon. For example, the end-user device 112 may take the form of a laptop, desktop, or workstation, among other wired end-user devices, or a PDA, cell phone or other conventional form of wireless device having web browsing and display capabilities. It is noted that although only a single end-user device 112 is shown in FIG. 1, a person skilled in the art will appreciate that each ISP-POP 106 may have a plurality of end-user devices 112 coupled thereto for accessing the content over the packet switched network 102. Further, the single end-user device 112 is shown at a first ISP 1-POP $106_1$ at a time $t_1$ and roaming to a second ISP 2-POP $106_2$ at a time $t_2$, and to a third ISP P-POP $106_p$ at a time $t_3$ via path 116 (drawn in phantom). The ability to continue receiving web pages from a particular gateway/cache proxy associated with a first ISP-POP when roaming to a different ISP-POP is discussed below in further detail.

The content provider network 120 comprises a plurality of content (origin) servers $126_1$ through $126_q$ (collectively content servers 126). The content servers 126 serve as origin servers and cache servers that provide content to a user requesting content from their web browsers, in accordance with the principles described below with respect to the method 300 of FIGS. 3A and 3B.

Content delivery service providers (CDSP) enable distribution of content (e.g., html pages and associated embedded objects) from the origin sites (i.e., content servers 126) to the edge (caching proxy) servers 110 on the edge of the network 102, and deliver content to the users from these edge servers 110. The distribution mechanism is based on pull technologies such as those used by proxies. The goal is to decrease the latency of user access to the objects by reducing the round-trip time to retrieve content between the browser 114 of the end-user device 112 and the content server 126 caused by the multiple TCP connections and DNS lookups before the HTTP page can be displayed.

In one embodiment, a gateway 104 is provided as a transparent interface between the ISP-POP 106 and the packet switched network 102. As shown in FIG. 1, not all ISP-POPs 106 may have an associated gateway 104. For example, ISP-1 POP 106₁ and ISP-P POP 106_p are respectively depicted having associated gateways 104₁ and 104₁ (where p>n), while exemplary ISP-2 POP 106₂ does not have an associated gateway of the present invention. Accordingly, the present invention is applicable to those end-user devices 112 accessing an ISP POP having an associated gateway of the present invention. This distinction will become more apparent as discussed below with respect to an end-user device 112 roaming between different ISP-POPs 106.

The gateway 104 comprises a URL rewrite program 130 that rewrites the embedded URLs in the top-level page of a requested web page in accordance with the principles of the present invention, as discussed below with respect to FIGS. 3 and 4. In general, the URL rewrite program 130 rewrites each embedded URL in the top-level page to include the IP address of a local cache proxy server. In this manner, the proxy server associated with the IP address rewritten in the embedded URLs establishes the TCP connections to the content servers to retrieve the images or files that are embedded within the top-level page. That is, the caching proxy establishes the multiple TCP connections over the high-speed links of the content provider and PSN 102. In this manner, the latency associated with retrieving embedded objects using the browser over the low speed links is avoided.

As shown in FIG. 1, network 100 illustratively comprises ISP-POP 106₁ coupled to the gateway 104₁ via a layer 4 switch 108₁. The layer 4 (L4) switch 108₁ may be provided by any conventional L4 switch capable of transferring multiple end-user device browser requests for content, as well as the responses/content back from the content providers. In one embodiment, the layer 4 switch 108 is used to couple the ISP 106 and gateway 104 to the packet-switched network 102. The URL rewrite program 130 of the gateway 104 interfaces with a caching proxy 110. In one embodiment, the gateway and caching proxy are separate and independent devices (i.e., computer devices), such as gateway 104₁ and caching proxy 110₁, as shown in FIG. 1. Accordingly, the gateway 104₁ and caching proxy 110₁ are assigned unique IP addresses in the network 100.

In a second embodiment, the gateway 104 and caching proxy are integrated in a common computer device, such as gateway n 104_n shown in FIG. 1. In this embodiment, the gateway 104_n comprises a URL rewrite program 130_n, as well as caching proxy program 110_n, as also shown in FIG. 1. As such, the gateway 104_n serves as the URL rewriter and cache proxy, is assigned a single IP address in the network, and is coupled to the ISP-POP 106_p and packet-switched network 102 via the L4 switch 108_n.

Figure 2:
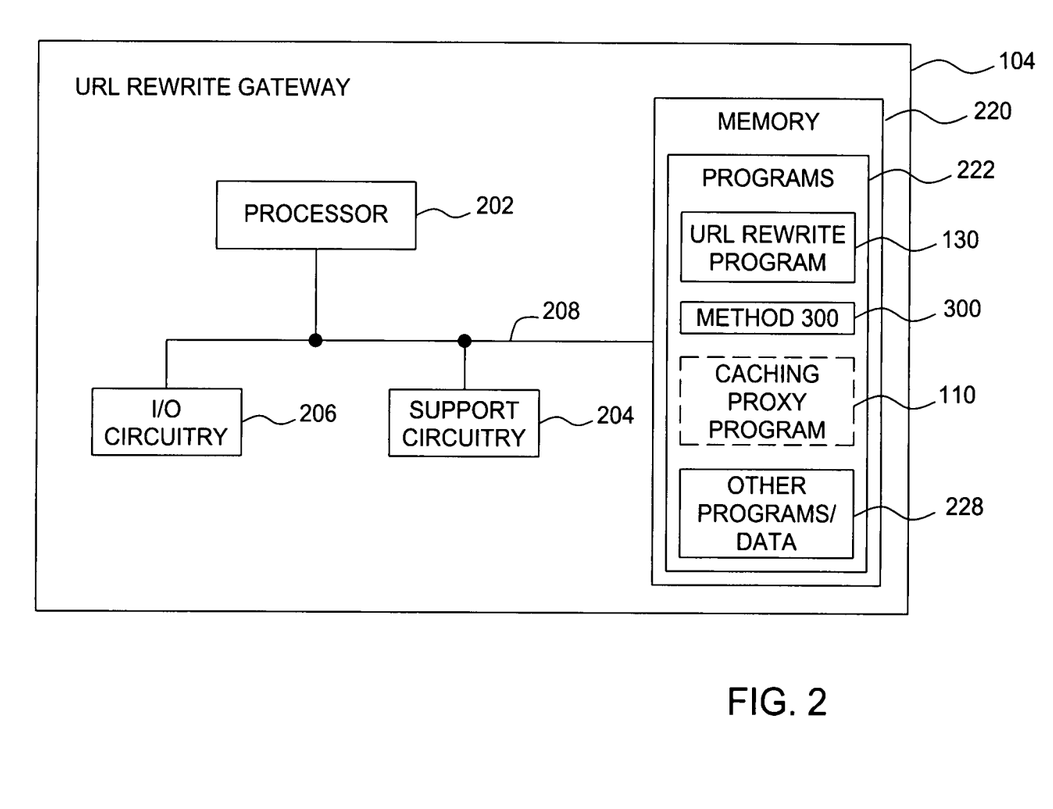
FIG. 2 depicts a high-level block diagram of a URL rewrite device suitable for use in the network of FIG. 1.

FIG. 2 depicts a high-level block diagram of a gateway 104 suitable for use in the network 100 of FIG. 1. Specifically, the gateway 104 of FIG. 2 comprises at least one processor 202, support circuitry 204, I/O circuitry 206, memory 220, and at least one bus 208 for exchanging information there between. The at least one processor 202 may be any conventional processor for executing programs stored in memory 220. The memory may be any conventional volatile memory (e.g., RAM, DRAM, among others), non-volatile memory (e.g., disk drives, floppy, drives, CDROM, EPROMS, among other computer readable medium) or any other conventional memory device for storing the various control programs 222 and data.

The processor 202 cooperates with conventional support circuitry 204, such as power supplies, clock circuits, cache memory and the like, as well as circuits that assist in executing the various programs and routines, such as a URL rewrite program 130, a caching proxy program 110, method 300 and other programs and data, which are illustratively shown as being stored in memory 220. It is noted that the caching proxy program 110 is shown drawn in phantom to represent one embodiment where the URL rewrite program 130 and caching proxy program 110 are combined in a single gateway device 104 having a common IP address, as opposed to separate devices having separate IP addresses. As such, it is contemplated that some of the process steps discussed herein as software processes may be implemented within hardware, for example, as circuitry that cooperates with the processor 202 to perform various steps. The gateway 104 also contains input/output (I/O) circuitry 206 that forms an interface between the various functional elements communicating with the gateway 104. For example, in the embodiment of FIG. 1, the gateway 104 communicates with the layer 4 switch 108, and optionally the caching proxy server 110₁.

Although the gateway 104 of FIG. 2 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

Figure 3A:
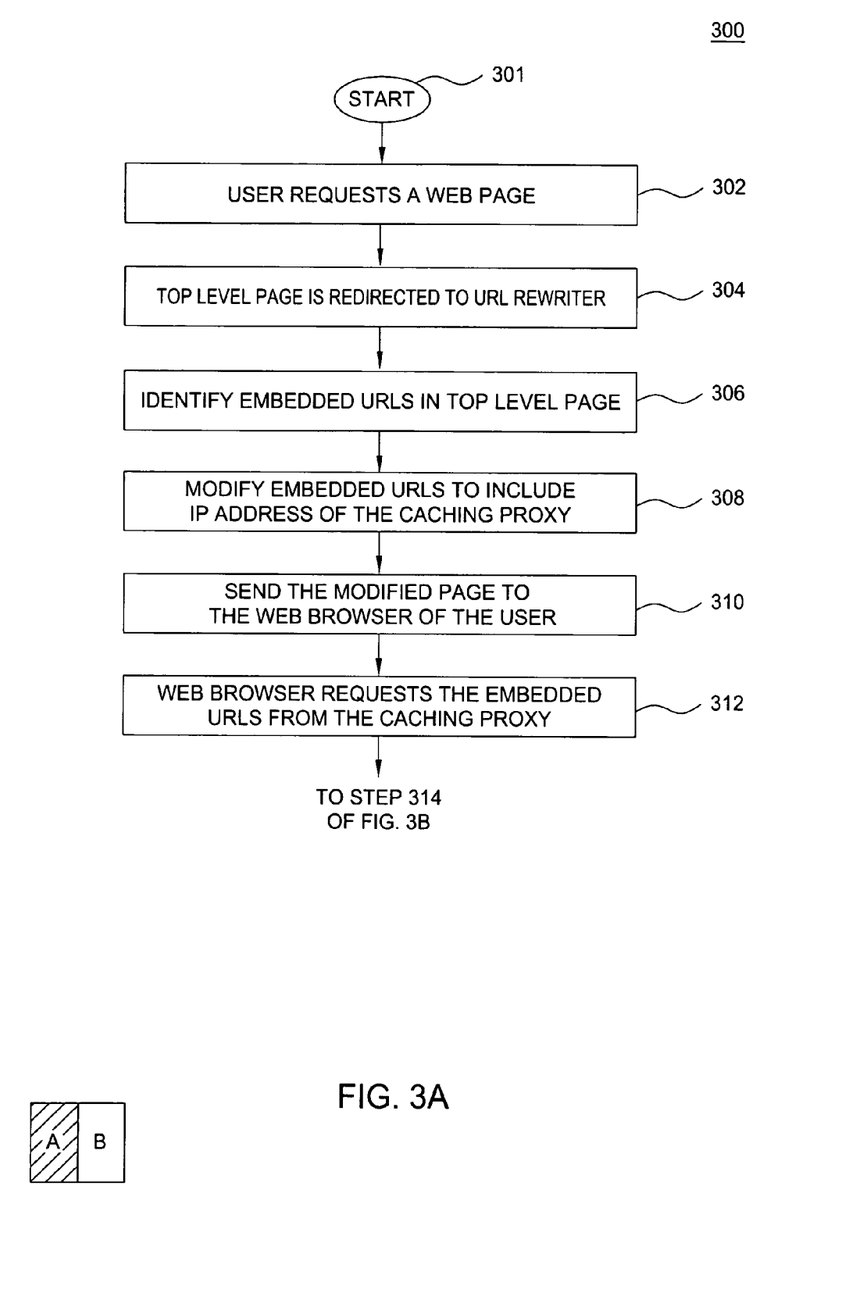
FIGS. 3A and 3B collectively depict a flow diagram of a method of providing URL rewriting for embedded objects in a web page, in accordance with the principles of the present invention.
Figure 3B:
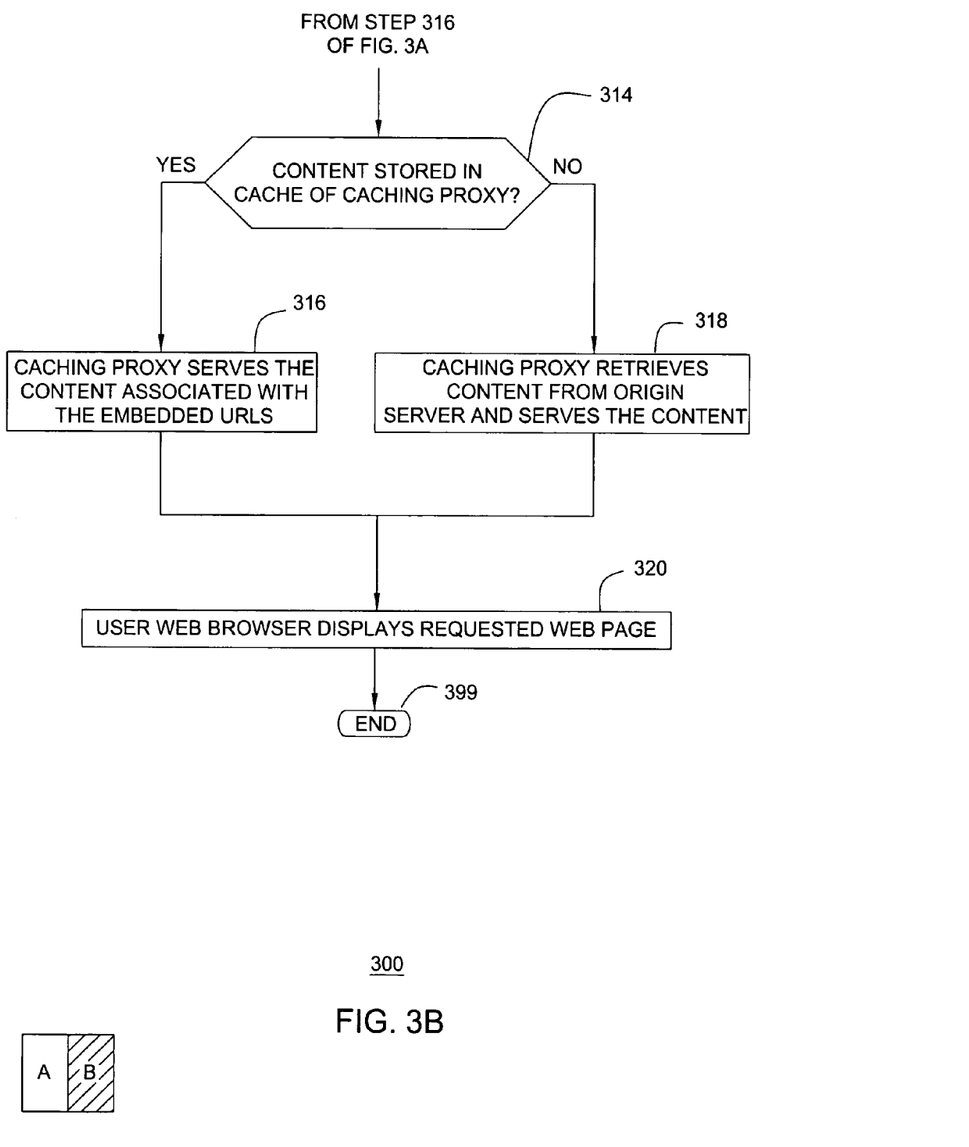

FIGS. 3A and 3B collectively depict a flow diagram of a method 300 of providing URL rewriting for embedded objects in a web page, in accordance with the principles of the present invention. The URL rewriting method 300 provides session level optimization and is similar to URL rewriting performed by CDN service providers as discussed above, except that the URL rewriting is performed closer to the client by the URL rewriting method of the present invention instead of at the server side as performed by CDN service providers. Further, instead of prefixing the URLs with domain names, the URLs are prefixed with the IP address of a caching proxy on the wireline network.

Referring to FIG. 3A, the method 300 starts at step 301, and proceeds to step 302, where a user of the end-user device 112 utilizes its web browser 114 installed thereon to request a web page from a content provider (i.e., a web content server 126). That is, the browser 114 sends the request for content associated with the top level page, which includes embedded objects associated with the corresponding URL. The method 300 then proceeds to step 304.

At step 304, when the browser 114 sends a request to a top level page, the request, as well as the response from the origin server 126, is transparently intercepted by the gateway 104. That is, the top-level page is redirected to the URL rewriter in a seamless manner from the perspective of the user. At step 306, the response from the content server 126 is parsed by the URL rewrite proxy 130 of the gateway 104 to identify the embedded URLs in the top level page. At step 308, the URL rewriting proxy 130 rewrites (modifies) the URLs of the embedded objects by prefixing them with the IP address of a caching proxy 110. As noted above with respect to FIG. 1, in one embodiment the URL rewriting proxy 130 and the caching proxy 110 are co-located in a single gateway 104 and share a common IP address. Alternatively, the URL rewriting proxy 130 and the caching proxy 110 are different entities on different computer devices respectively having differing IP addresses.

Figure 4:
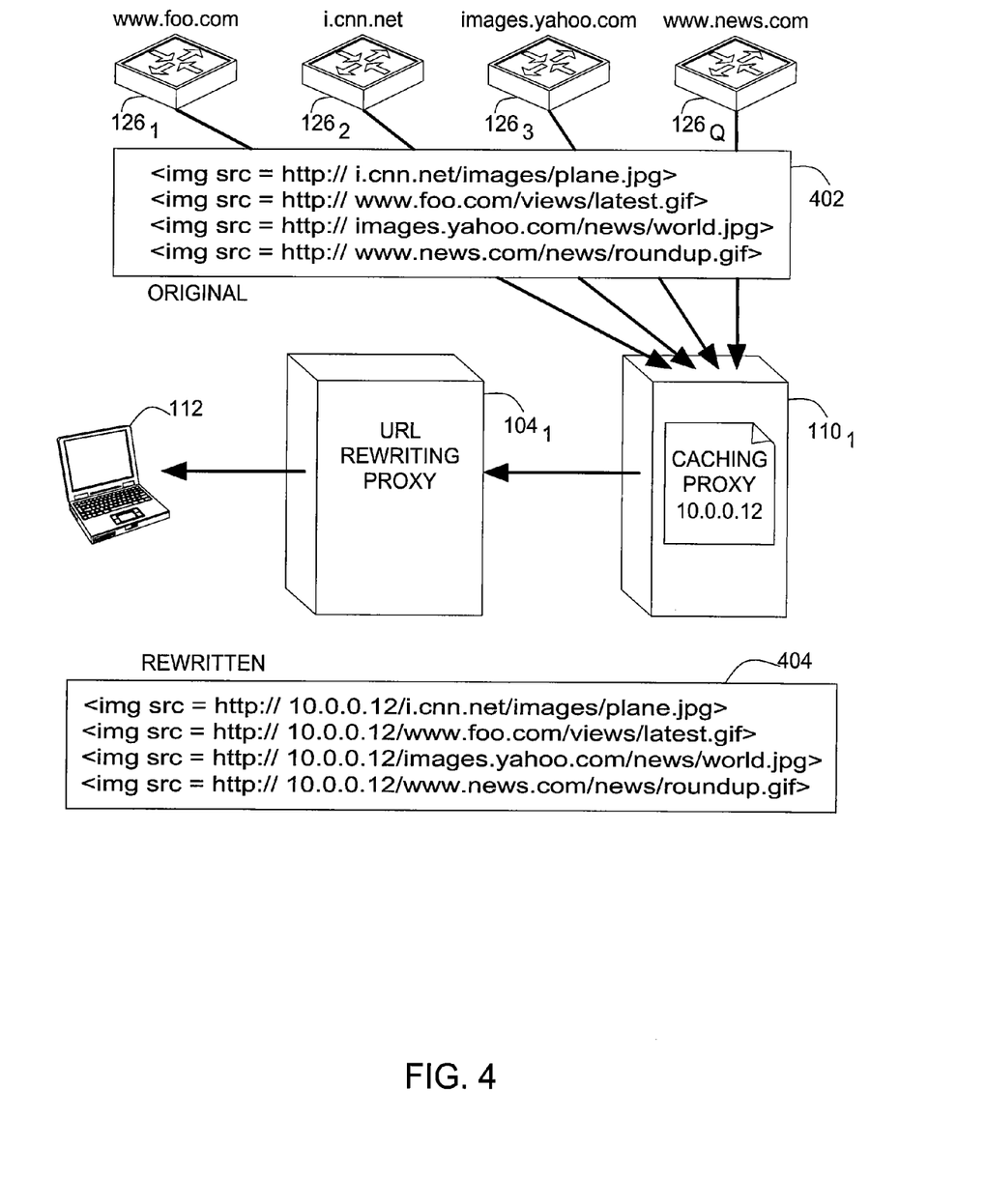
FIG. 4 depicts a flow diagram illustrating transformation of embedded URLs in accordance with the method of FIG. 3.

FIG. 4 depicts a flow diagram illustrating transformation of embedded URLs in accordance with method 300 of FIGS. 3A and 3B. Referring to FIG. 4, four exemplary embedded URLs are shown being associated with the parsed content from an exemplary top-level page having the domain name "www-.foo.com." The four exemplary embedded objects 402 in original form include two jpg files: i.cnn.net/images/plane-.jpg and images.yahoo.com/news/world.jpg, as well as two gif files: www.foo.com/latest.gif and www.news.com/news/rpundup.gif. Each of these exemplary embedded objects is illustratively stored on a different content server 126.

Assume that the browser 114 of the end-user device 112 requests the top level page from www.foo.com. The URL rewriting proxy 130 transparently intercepts this page and prefixes the embedded URLs with the IP address of the caching proxy 110 (which illustratively is 10.0.0.12), as shown in box 404. For example, http://i.cnn.net/images/plane.jpg is changed to http://10.0.0.12/i.cnn.net/images/plane.jpg.

TABLE 1 shows the exemplary embedded URLs in their respective original and rewritten form.

TABLE 1

Example of URL Rewriting

Original URLs Embedded in Top-Level of Requested Page

<img src = http://i.cnn.net/images/plane.jpg>
<img src = http:// www.foo.com/views/latest.gif>
<img src = http:// images.yahoo.com/news/world.jpg>
<img src = http:// www.news.com/news/roundup.gif>
Rewritten embedded URLs <img src = http:// 10.0.0.12/i.cnn.net/plane.jpg>
<img src = http:// 10.0.0.12/www.foo.com/views/latest.gif>
<img src = http:// 10.0.0.12/images.yahoo.com/news/world.jpg>
<img src = http:// 10.0.0.12/www.news.com/news/roundup.gif>

Referring to FIG. 4, the exemplary caching proxy 110 has an illustrative IP address of 10.0.0.12, which is prefixed to each of the embedded URL addresses. In the embodiment where the URL rewriting program 130 and caching proxy program 110 are facilitated in the same computer device (e.g., gateway $104_n$ in FIG. 1), the IP address prefixed to the embedded URLs is the IP address of the gateway 104 having the URL rewrite program itself. Alternatively, in an embodiment where the URL rewrite program 130 is installed separate and apart from a caching proxy 110 (e.g., gateway $104_1$ and caching proxy $110_1$ in FIG. 1), the IP address of the caching proxy $110_1$ is prefixed to the embedded URLs.

Referring to FIG. 3A, at step 310, the modified page including the rewritten URLs for the embedded objects is sent to the web browser 114 of the end-user device 112. At step 312, the web browser 114 requests the objects associated with the embedded URLs from the caching proxy 110 to generate the requested web page on the display of the end-user device 112.

Following the example provided above, when the browser 114 retrieves the embedded objects, the browser 114 opens a TCP connection to the proxy server $110_1$, illustratively at the IP address 10.0.0.12, and requests the URL (e.g., i.cnn.net/images/plane.jpg, images.yahoo.com/news/world.jpg, news-.com/news/roundup.gif, among the other rewritten URLs from the top level page. This is similar to a request that would have been sent by the browser if it had been explicitly configured to connect to the caching proxy.

Referring to FIG. 3B, at step 314, a determination is made whether the content is stored in the cache of the caching proxy. That is, the caching proxy 110 determines whether the content is stored therein, and if not will retrieve the content from the origin (i.e., content) servers 126.

Specifically, if at step 314, the object is stored locally at the caching proxy 110, at step 316, the caching proxy 110 retrieves and serves the content associated with the embedded URLs. Otherwise, if the object is not locally stored at the caching proxy 110, then the method proceeds to step 318.

At step 318, the caching proxy 110 retrieves the information associated with each embedded URL from the content servers 126. That is, once a TCP connection is established to 10.0.0.12 (i.e., the proxy server), the browser 114 uses this connection to retrieve other embedded objects (i.e., the exemplary .gif and .jpg images as shown in FIG. 4) from the content servers 126. For example, the caching proxy 110 connects to i.cnn.net to retrieve /images/plane.jpg. At step 320, the web browser 114 displays the web page including the objects retrieved from the caching proxy 110 on the end-user device 112. Once the web page with its associated embedded objects have been received at the browser 114, the method 300 then proceeds to step 399, where the method 300 ends.

It is noted that other top level pages may be rewritten to prefix embedded URLs with the same IP address, and accordingly, more objects are retrieved through the same connection, until the connection is torn down. Thus, TCP connection setup across the low speed (e.g., wireless) link is restricted to only one TCP connection (or a few connections if connections are opened in parallel) to the caching proxy 110. As evident from the description, with URL rewrite, all the embedded objects in all top level pages from all web sites come from the same caching proxy 110.

It is further noted that no DNS requests are made by the browser 114 during this process as the IP address is prefixed to the embedded URLs. The only DNS request made is the one to resolve the domain name of the content server 126 that hosts the top-level page. The DNS request for the embedded object at i.cnn.net is made by the caching proxy, if need be, over the wireline network, which is much faster than the low-speed link, such as the wireless link or dial-up connection.

The URL rewriting procedure of the present invention will impact mobile end-user devices under different circumstances. For this discussion, it is assumed that the gateway 104 and the caching proxy 110 are co-located when deployed in the network. We refer to the combination of the URL rewriting gateway and the caching proxy 110 collectively as the gateway 104, since there is no ambiguity. Also recall that HTTP requests are transparently intercepted by the gateway 104. That is, a Layer 4 switch 108 transparently redirects all HTTP requests (i.e., port 80) to the gateway 104.

The present invention accommodates instances where a mobile user moves from its current region to a new region, where "region" refers to an area served by a single gateway 104 infrastructure (Layer 4 switch 108 plus a gateway 104 or a farm of gateways 104). Such a definition is independent of whether mobility takes place within a single service provider or between different service providers. When a user moves from the current region with gateway 104 service to a new region with gateway 104 service, this means the user requests in the new region are serviced by a gateway 104 infrastructure that is different from the one in the current region.

There are three circumstances to consider with respect to the end-user device 112 moving between regions with respect to URL rewriting of the links to embedded objects in a top-level page with the IP address of a specific cache. A first scenario is where the gateway 104 service is not available in the current region, but is available in the new region. A second scenario is where the gateway 104 service is available both in the current and new regions. Finally, another circumstance is the gateway 104 service is available in the current region, but not in the new region. In each of these circumstances, attention must be given to whether the user is in the middle of a page download, or reloading the top-level page from the browser cache after having moved. That is, in one embodiment the top-level page may be sent to the browser of the mobile device while in a first region (i.e., first access network), and prior to the embedded objects being downloaded to the browser, the mobile device roams to a second region (i.e., second access network). The following discussion addresses different techniques that may be utilized to address the various circumstances where the first region (where the top-level page was retrieved) is or is not still accessible from the second region, and whether there is gateway service associated with the first and/or second regions.

In an instance where gateway 104 service is not available in the current region but available in the new region, only new HTTP session requests (represented by new TCP connection requests) are serviced by the gateway 104 infrastructure in the new region. Referring to FIG. 1, the end-user device 112 is shown as roaming between access networks 106$_2$ and 106$_p$ via path 116 (drawn in phantom). Specifically, at time $t_2$, the end-user device (mobile device) 112 is retrieving content from the second access network (ISP-2 POP) 106$_2$. At a later time $t_3$, the mobile device 112 moves to another location and is able to communicate with a different access network. For example, at a time $t_3$ the end-user device 112 moves into vicinity of the third ISP-3 POP 106$_p$.

Access network ISP-2 POP 106$_2$ does not have an associated gateway 104 of the present invention. Accordingly, existing HTTP sessions initiated in the current region go directly to the origin server. Therefore, the top-level page is not URL-rewritten. Thus existing TCP connections from the current region are used to complete all unfinished downloads from the origin server. New connections in the new region benefit from session level optimizations of the URL rewrite gateway/caching proxy 104 discussed above.

The impact on the efficiency of the browser cache 110 depends on the actual session-level optimization used. While in the current region, the browser cache indexes objects based on their domain names as the key (e.g., www.foo.com/image.gif). With URL rewriting in the new region, if the client refreshes a top-level page, the same embedded objects can now be referred to with a different URL (e.g., 10.0.0.12/www.foo.com/image.gif). This could happen if the top-level page has expired and need to be refreshed, for example, in case of a dynamic top-level page. This will cause the browser 114 to fetch some embedded objects even if they are cached locally, though under a different name.

In an instance where the gateway 104 service is available at both the current and new regions, the service remains uninterrupted with respect to URL rewriting. In particular, as the user moves, new connections for web pages get serviced by the new region. Referring to FIG. 1, the end-user device 112 is shown as roaming between access networks 106$_1$ and 106$_p$ via path 116 (drawn in phantom). Specifically, at time $t_1$, the end-user device (mobile device) 112 is retrieving content from the first access network (ISP-1 POP) 106$_1$. At a later time, the mobile device 112 moves to another location and is able to communicate with a different access network. For example, at time $t_3$ the end-user device 112 moves into the vicinity of the third access network ISP-3 POP 106$_p$.

If the user moves from the current region (e.g., access network 106$_1$) to the new region in the middle of an object download, then two cases arise: (i) if the current gateway 104$_1$ is accessible from the new region, then the existing TCP connections will still be serviced by the current gateway 104$_1$, while new connections will be serviced by the new gateway 104. (ii) If the gateway 104 in the current region is not reachable from the new region, then the new gateway 104 will reset the TCP connection and the browser 114 will automatically open a new TCP connection to retrieve the object.

The impact on browser caching in this second circumstance is minimal. Suppose, for example, the current gateway 104 has rewritten the embedded object URLs with an IP address prefix of 10.0.0.12. Thus, the browser cache contains objects with the same prefix (e.g., 10.0.0.12/www.foo.com/image.gif). If the client now refreshes the top-level page in the new region, two cases can arise depending on the IP address prefix used by the new gateway 104. Usage of the same IP address (e.g., 10.0.0.12) results in browser cache hit. If the IP addresses are different (e.g., 20.0.0.1 is used by the new gateway 104) there is a browser cache miss for the object (e.g., 20.0.0.1/www.foo.com/image.gif), and the object is fetched even though it exists in the cache with a different key.

Usage of the same IP address technically poses no problem. Consider FIG. 4 where the links to embedded objects are rewritten to point to IP address 10.0.0.12, which is the same as the caching proxy. However, note that the IP address used to rewrite embedded object URLs does not have to match the caching proxy's IP address. As a matter of fact, it could be any valid IP address. When HTTP requests are made to the rewritten IP address, they are transparently redirected to the gateway 104 based only on the destination TCP port number and not on the IP address. Therefore, for the technique to work, a gateway 104 can use a "virtual" IP address of its choice to rewrite top-level pages. However, to improve the hit rate in the browser cache, it is preferable that the same IP address is used by all the gateways 104. This requires pre-configuration of all gateway 104s to use the same IP address to rewrite embedded object URLs.

The third circumstance is where the gateway 104 service is available in the current region, but not available in the new region. That is, a user moves from a region where gateway 104 service is available to a region where gateway 104 service is unavailable (for example, from an ISP who provides gateway 104 service to another who does not).

Consider the situation where a user moves from a region with the gateway 104 service to a region without the gateway 104 service in the middle of a page download. Assume that the rewritten top-level page had been downloaded and the embedded objects are being downloaded. The requests to embedded objects from the new region will fail as the browser will try to fetch them from a cache IP address (say, 10.0.0.12). As the new region is unaware of the gateway 104 service, there is no transparent redirection to a cache, and requests to this (virtual) IP address will fail. A similar situation occurs when a rewritten top-level page is retrieved from the browser cache after the user moves to a new region with no gateway 104 service. The browser cache will try to fetch the embedded objects that have been rewritten using the 10.0.0.12 IP address, and unless they are locally cached as well, these requests will fail. If the top-level page itself is retrieved from the network after the mobile node 112 has moved to the new region, all the operations will progress correctly. That is, the top-level page and the embedded objects will now be fetched from the origin servers 126. However, the browser's cache efficiency will be reduced, since existing cached objects are now referred under a different name.

In one embodiment, a public and globally routable virtual IP address (e.g. 192.11.210.2) that is used by each gateway 104 to rewrite embedded object URLs is selected, to prevent requests from failing when the browser cache tries to fetch objects with previously rewritten URLs (e.g. 10.0.0.12). This IP address would represent one or more caches 110 in the current region's network that are globally reachable from any other region. A summary comparison of effect on mobility is provided below in TABLE 2.

TABLE 2

Effect on Mobility

| EFFECT ON | NO GTWY TO GTWY | GTWY TO GTWY | GTWY TO NO GTWY |
|---|---|---|---|
| Ongoing Sessions | No Impact (Directly to Origin Server) | No Impact (Browser automatically reinitiates) | No Impact (With use of global IP for Cache) |
| Browser Cache | Some misses | No Impact (With use of same virtual IP address) | Some misses |

The URL rewriting feature as described in the embodiments of the present invention provide session level optimization techniques to enhance HTTP download mechanisms "mimic" the behavior of FTP over the wireless link to achieve better throughput. This technique (a) minimizes the number of DNS lookups over the wireless link and (b) minimizes the number of TCP connections opened by the browser. These optimizations bridge the mismatch caused by wireless links between application-level protocols (such as HTTP) and transport-level protocols (such as TCP). In other words, most of the DNS lookups and short-lived TCP connections are pushed to the wireline part of the network, making the wireless part behave like an FTP session. The solutions are HTTP standards compliant and do not require any changes to be made to web-clients, web servers and/or DNS servers. By rewriting the embedded objects to point to a cache proxy of the provider equipment, it has been observed that the end-user is able to perceive a significant (e.g., 30% to 50%) decrease in end-to-end user latency. Further, it has been observed that the data throughput across wireless links has significantly increased (e.g., approximately 50% to 100%) for HTTP sessions.

It is further noted that in one embodiment, one or more switches (e.g., L4 switches) 108 may be programmed to provide TCP port-based redirection. In this embodiment, the layer 4 switch 108 ignores the rewritten IP address and only looks at the port number to determine where the objects are to be redirected. That is, once the L4 switch identifies the port number, it doesn't matter which access network the mobile device is accessing or the IP address used in the rewritten URLs. Rather, the embedded objects will be routed to the mobile device by the L4 switch based on the port number.

For example, assume a top-level page has been provided to a mobile device from a first access network 106$_1$ associated with a first gateway 104$_1$. The mobile device 112 then roams from the coverage region of the first gateway to a second region associated with a second gateway 106$_p$, but prior to retrieving embedded objects from the first gateway. That is, the browser 114 has only received the top-level page from the first gateway. In this illustrative example, if a L4 switch 108$_p$ associated with the second gateway is programmed to provide TCP port-based redirection, the embedded objects will be redirected from the origin servers to mobile device 112 regardless of any rewritten URLs associated with the embedded objects. Therefore, providing TCP port-based redirection at a L4 switch enables routing of the content regardless of the IP address (real or virtual) that may have been used to rewrite the URLs.

Although various embodiments that incorporate the teachings of the present invention have been shown and described in detail herein, those skilled in the art can readily devise many other varied embodiments that still incorporate these teachings.

What is claimed is:

1. A method for retrieving embedded objects of a web page across links, comprising:
   receiving, at a gateway serving a current region, a requested web page having at least one embedded uniform resource locator (URL) from at least one content server in response to a request for said web page from an end-user device associated with an end-user browser;
   modifying said at least one embedded URL with an IP address of a caching proxy;
   sending said web page and modified embedded URLs to said end-user browser, wherein said end-user browser is configured to receive said at least one embedded URL from said caching proxy; and
   redirecting said web page to thereby bypass said modified embedded URL in response to said end user device roaming from the current region to a new region associated with a gateway different from the gateway serving the current region.

2. The method of claim 1, further comprising:
   retrieving, by said caching proxy, said at least one embedded object from said at least one content server.

3. The method of claim 1, wherein said receiving said web page further comprises:
   receiving said requested web page and at least one embedded URL in response to a request for said web page from an end-user browser.

4. The method of claim 1, wherein said modifying said at least one embedded URL further comprises:
   prefixing an IP address of said caching proxy to the embedded URL address.

5. The method of claim 1, wherein said modifying said at least one embedded URL further comprises:
   modifying the at least one embedded URL with an IP address of a caching proxy having an IP address different from said gateway.

6. The method of claim 1, wherein said modifying said at least one embedded URL further comprises:
   modifying the at least one embedded URL with an IP address common to both said gateway and said caching proxy.

7. The method of claim 1, wherein said gateway uses a selected virtual IP address to rewrite embedded object URLs in a web page.

8. The method of claim 1, wherein said gateway uses a public and globally routable virtual IP address to rewrite embedded object URLs in a web page.

9. The method of claim 1, wherein said receiving at a gateway further comprises:
   receiving said requested web page from the roaming end-user device having web browsing capabilities.

10. The method of claim 9, wherein in an instance where said end-user device is roaming from a first access network not having gateway service to a second access network associated with said gateway, said method further comprises:
    modifying said at least one embedded URL with an IP address of a caching proxy for only new requests for said web page; and
    sending said web page and modified embedded URLs associated with the new requests to said end-user browser, wherein said end-user browser is adapted to receive said at least one embedded URL from said caching proxy.

11. The method of claim 9, wherein in an instance where said end-user device is roaming from a first access network having gateway service from said gateway to a second access network not associated with a second gateway, said method further comprises:
providing said web page and embedded objects from said gateway in an instance where said first access network is accessible.

12. The method of claim 9, wherein in an instance where said end-user device is roaming from a first access network having gateway service from said gateway to a second access network associated with a second gateway, said method further comprises:
providing said web page and embedded objects from said gateway in an instance where said first access network is accessible.

13. The method of claim 9, wherein in an instance where said end-user device is roaming from a first access network having gateway service from said gateway to a second access network associated with a second gateway, said method further comprises:
modifying said at least one embedded URL with an IP address of a caching proxy for only new requests for said web page; and
sending said web page and modified embedded URLs associated with the new requests to said end-user browser, wherein said end-user browser is adapted to receive said at least one embedded URL from said caching proxy.

14. The method of claim 9, wherein in an instance where said end-user device is roaming from a first access network having gateway service from said gateway to a second access network associated with a second gateway, said method further comprises:
providing said web page from said gateway in an instance where said first access network is accessible; and
prior to retrieving embedded objects from said gateway, providing said embedded objects via said second gateway in an instance where said gateway is no longer accessible and said second gateway has an IP address identical to said gateway.

15. The method of claim 9, wherein in an instance where said mobile device is roaming from a first access network having gateway service from said gateway to a second access network associated with a second gateway, said method further comprises:
providing said web page from said gateway in an instance where said first access network is accessible; and
prior to retrieving embedded objects from said gateway, providing said embedded objects via said at least one origin server in an instance at least one switch is programmed to provide TCP port-based redirection, and said second gateway has an IP address differing from said gateway.

16. Apparatus for retrieving embedded objects of a web page across links, comprising:
means for receiving, at a gateway serving a current region, a requested web page having at least one embedded uniform resource locator (URL) from at least one content server in response to a request for said web page from an end-user device associated with an end-user browser;
means for modifying said at least one embedded URL with an IP address of a caching proxy;
means for sending said web page and modified embedded URLs to said end-user browser, wherein said end-user browser is configured to receive said at least one embedded URL from said caching proxy; and
means for redirecting said web page to thereby bypass said modified embedded URL in response to said end user device roaming from the current region to a new region associated with a gateway different from the gateway serving the current region.

17. The apparatus of claim 16, wherein said gateway and said caching proxy are co-located and have a common IP address.

18. The apparatus of claim 16, wherein said gateway and said caching proxy have different IP addresses.

19. A computer readable medium including software instructions that, when executed by a processor, perform a method, comprising:
receiving, at a gateway serving a current region, a requested web page having at least one embedded uniform resource locator (URL) from at least one content server in response to a request for said web page from an end-user device associated with an end-user browser;
modifying said at least one embedded URL with an IP address of a caching proxy;
sending said web page and modified embedded URLs to said end-user browser, wherein said end-user browser is configured to receive said at least one embedded URL from said caching proxy; and
redirecting said web page to thereby bypass said modified embedded URL in response to said end user device roaming from the current region to a new region associated with a gateway different from the gateway serving the current region.

20. A method for retrieving embedded objects of a web page across links, comprising:
propagating toward a gateway serving a current region, a request for a web page having at least one embedded uniform resource locator (URL) from at least one content server in response to the request for said web page;
receiving said web page and the embedded URLs modified with an IP address of a caching proxy;
roaming from the current region to a new region associated with a gateway different from the gateway serving the current region; and
receiving a redirected web page wherein said modified embedded URL is bypassed in response to being located in the new region.

* * * * *